US012596331B2

(12) United States Patent
Kurokawa et al.

(10) Patent No.: US 12,596,331 B2
(45) Date of Patent: Apr. 7, 2026

(54) ELECTRONIC DEVICE AND WATCH

(71) Applicant: CASIO COMPUTER CO., LTD., Tokyo (JP)

(72) Inventors: Tomoyasu Kurokawa, Kokubunji (JP); Takayuki Satou, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 288 days.

(21) Appl. No.: 18/470,783

(22) Filed: Sep. 20, 2023

(65) Prior Publication Data

US 2024/0103445 A1 Mar. 28, 2024

(30) Foreign Application Priority Data

Sep. 22, 2022 (JP) ................................. 2022-150831

(51) Int. Cl.

| | |
|---|---|
| ***G04B 37/22*** | (2006.01) |
| ***G04B 45/00*** | (2006.01) |
| ***G04G 17/08*** | (2006.01) |
| ***G04G 21/04*** | (2013.01) |

(52) U.S. Cl.

CPC ....... *G04B 37/225* (2013.01); *G04B 45/0084* (2013.01); *G04G 17/08* (2013.01); *G04G 21/04* (2013.01)

(58) Field of Classification Search

CPC .............. G04B 37/225; G04B 45/0084; G04B 37/223; G04B 37/08; G04G 17/08; G04G 21/04; G04G 17/00

See application file for complete search history.

(56) References Cited

U.S. PATENT DOCUMENTS 4,178,751 A 12/1979 Liautaud
4,817,065 A * 3/1989 Usui ...................... G04G 17/08 968/878
11,789,409 B2 * 10/2023 Hata .................... G04B 37/084 368/286
11,822,292 B2 * 11/2023 Satou .................. G04B 37/005
2020/0310352 A1 10/2020 Yasuda

FOREIGN PATENT DOCUMENTS

| | | | |
|---|---|---|---|
| CN | 215813759 | U | 2/2022 |
| JP | S55-168890 | U | 12/1980 |
| JP | S62-130374 | A | 6/1987 |
| JP | H10339782 | A | 12/1998 |
| JP | 2000286761 | A | 10/2000 |
| JP | 2001-099956 | A | 4/2001 |
| JP | 2005-098975 | A | 4/2005 |

(Continued)

OTHER PUBLICATIONS

Notice of Reasons for Refusal dated Sepetember 10, 2024 received in Japanese Patent Application No. 2022-150831.

(Continued)

*Primary Examiner* — Edwin A. Leon

(74) *Attorney, Agent, or Firm* — Scully, Scott, Murphy & Presser, P.C.

(57) ABSTRACT

An electronic device includes: a cylindrical device casing that houses a module; and a resin member provided on an outside of the device casing. The resin member prevents at least a circumferential surface and a bottom surface side of the device casing from being exposed outside.

13 Claims, 4 Drawing Sheets

(56) References Cited

FOREIGN PATENT DOCUMENTS

| | | | |
|---|---|---|---|
| JP | 2006-112892 | A | 4/2006 |
| JP | 2014-181923 | A | 9/2014 |
| JP | 2021-051097 | A | 4/2021 |
| JP | 2021117079 | A | 8/2021 |
| WO | 2021/071667 | A | 4/2021 |

OTHER PUBLICATIONS

Notice of Reasons for Refusal dated Dec. 3, 2024 received in Japanese Patent Application No. 2022-150831.
Extended European Search Report dated Feb. 19, 2024 received in European Patent Application No. EP 1 23196826.4.
Office Action dated Sep. 25, 2025 received in European Patent Application No. 23196826.4.

* cited by examiner

ELECTRONIC DEVICE AND WATCH

REFERENCE TO RELATED APPLICATIONS

This application is based upon and claims the benefit of priority from the prior Japanese Patent Application No. 2022-150831, filed on Sep. 22, 2022, the entire contents of which are incorporated herein by reference.

TECHNICAL FIELD

The present disclosure relates to an electronic device and a watch.

DESCRIPTION OF RELATED ART

JP S55-168890 U discloses an electronic device including a device casing that houses therein a module including various electronic components.

A device casing formed by integrally combining a covering member of a metal material and a castable injection material arranged on the inner side is further disclosed. A configuration in which a back cover formed of metal or resin is attached to a back surface side of the device casing is also disclosed.

SUMMARY OF THE INVENTION

An electronic device according to the present disclosure includes: a cylindrical device casing that houses a module; and a resin member provided on an outside of the device casing. The resin member prevents at least a circumferential surface and a bottom surface side of the device casing from being exposed outside.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

One embodiment of an electronic device and a watch according to the present disclosure will be described with reference to the drawings. In the present embodiment, description will be provided illustrating a case in which the electronic device is a watch for use in a state worn on the arm of a user.

Although various limitations which are technically preferable for implementing the present disclosure are imposed on the embodiment which will be described below, the scope of the present disclosure is not limited to the following embodiment and illustrated example.

[Configuration]

Figure 1:
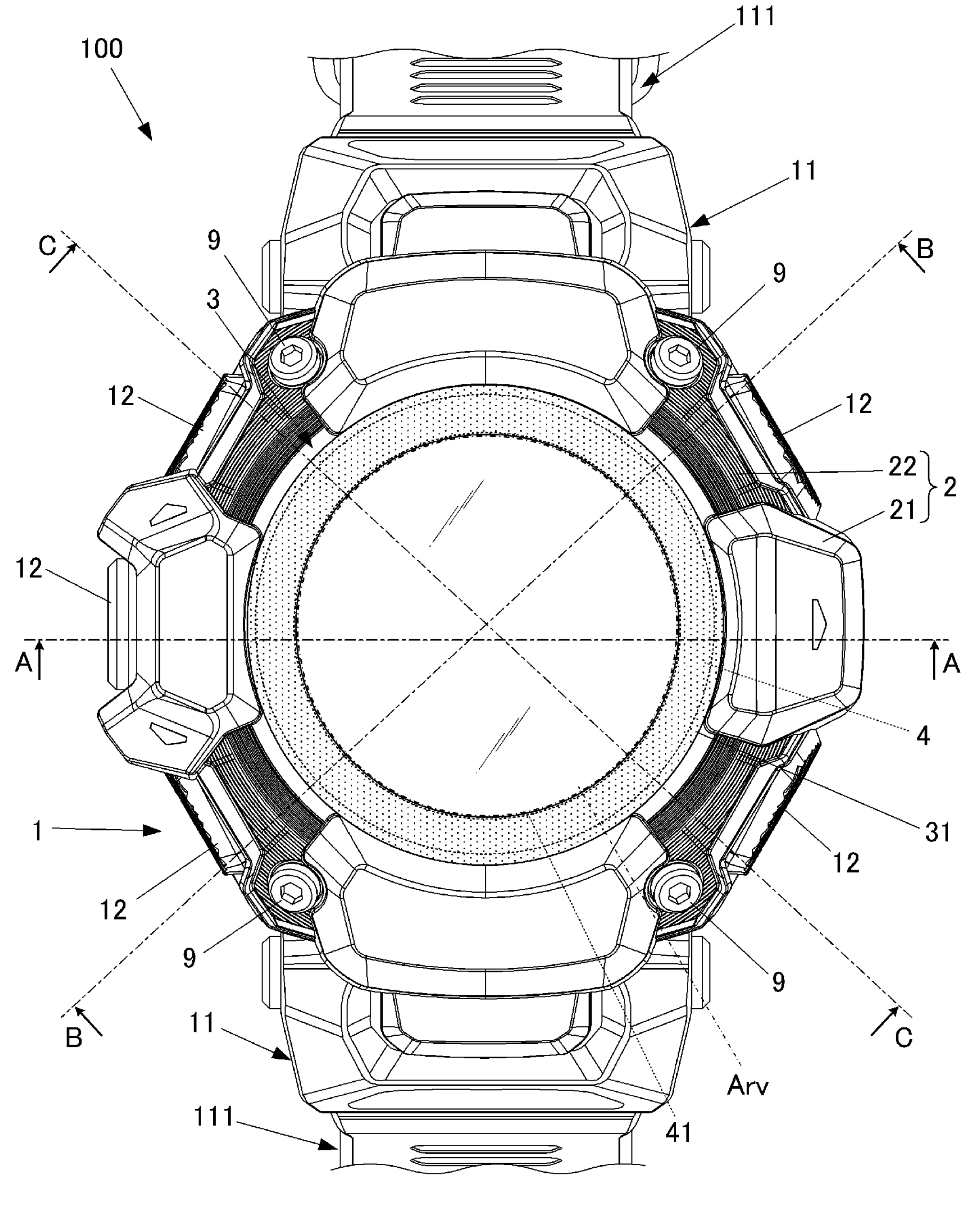
FIG. 1 is a front view of a watch in an embodiment.
Figure 2:
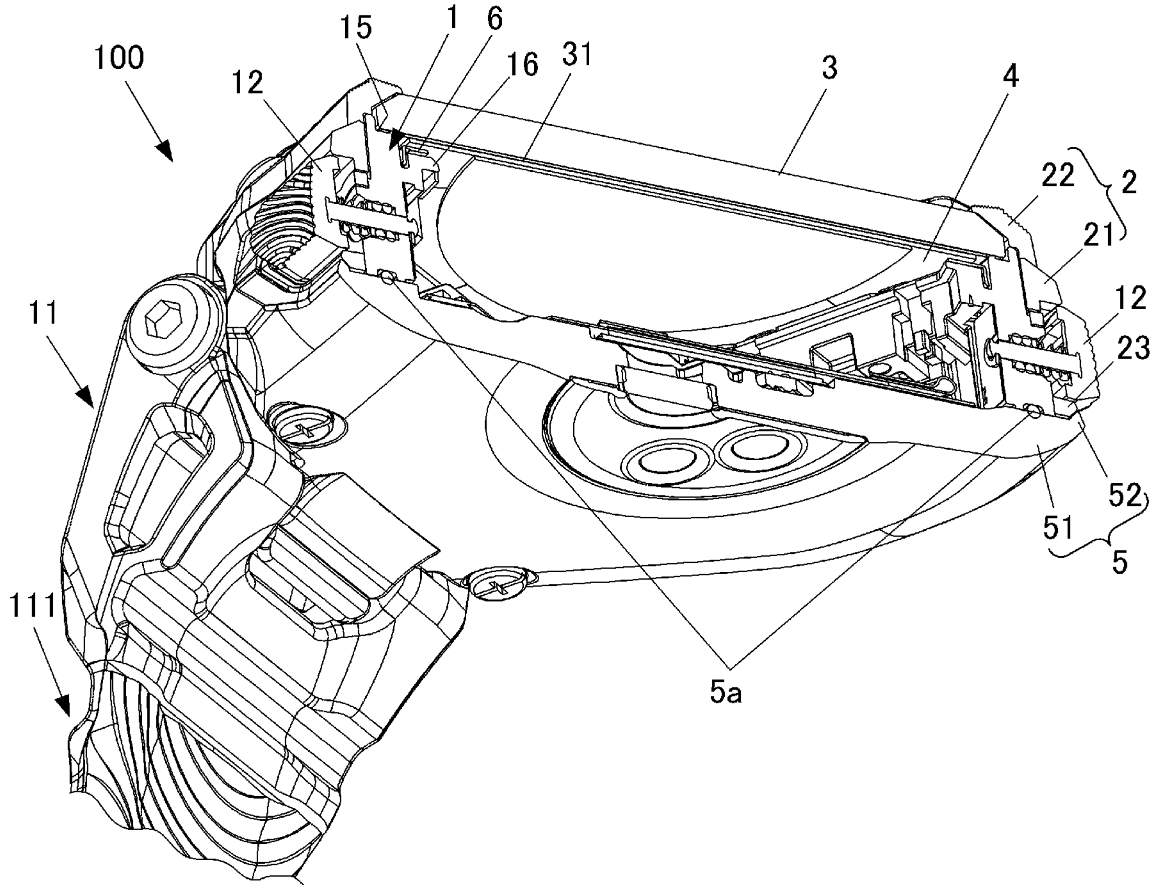
FIG. 2 is a perspective view showing a cross section of part of the watch shown in FIG. 1.
Figure 3:
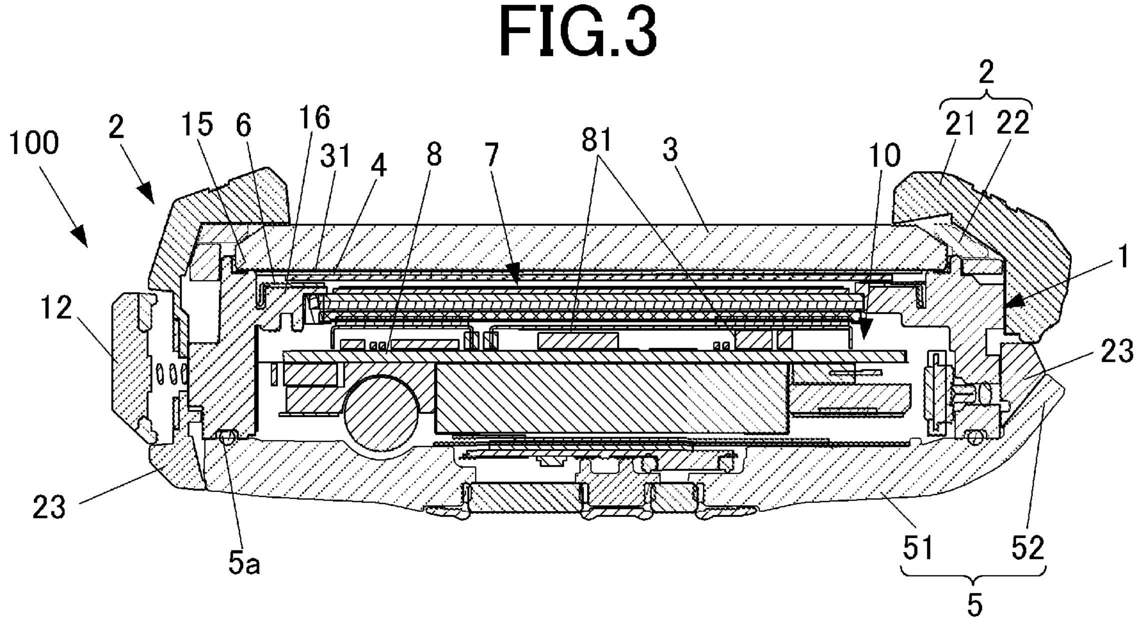
FIG. 3 is a cross-sectional view of the watch taken along the line A-A in FIG. 1.
Figure 4:
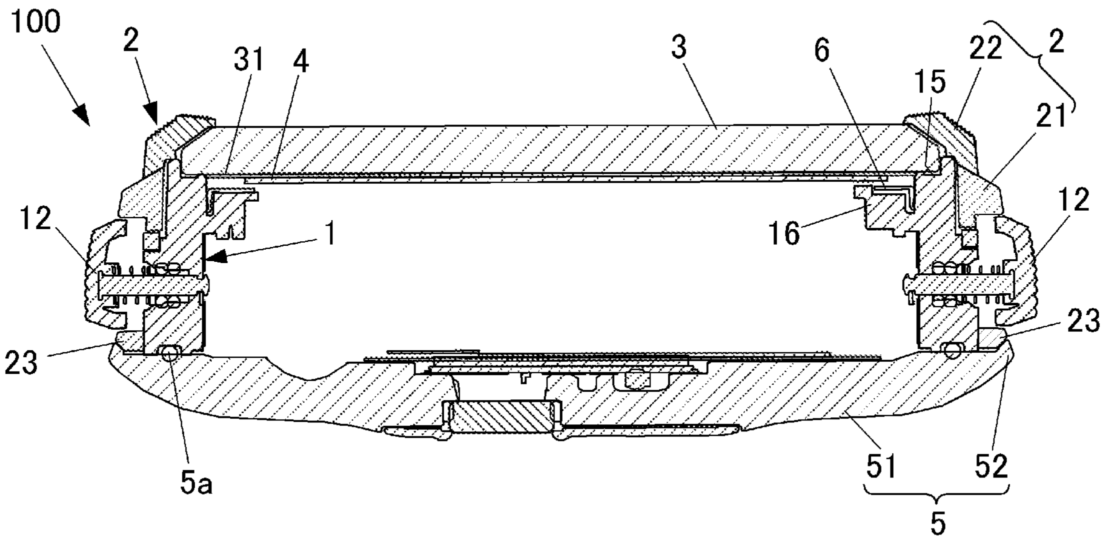
FIG. 4 is a cross-sectional view of an essential part showing a cross section of the watch taken along the line B-B in FIG. 1 in a state where a module housed therein has been removed.
Figure 5:
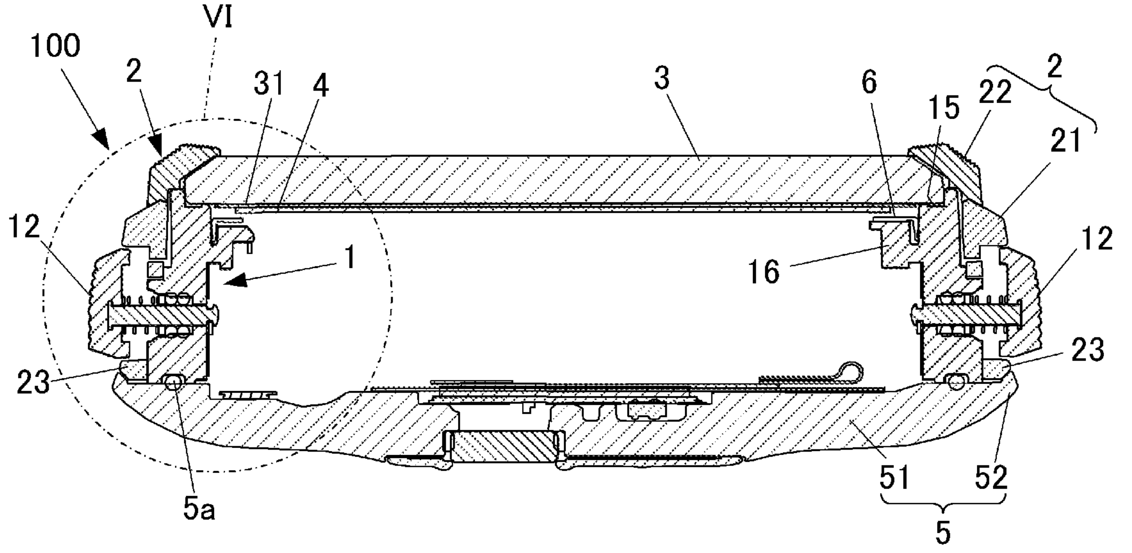
FIG. 5 is a cross-sectional view of the essential part showing a cross section of the watch taken along the line C-C in FIG. 1 in a state where the module housed therein has been removed.
Figure 6:
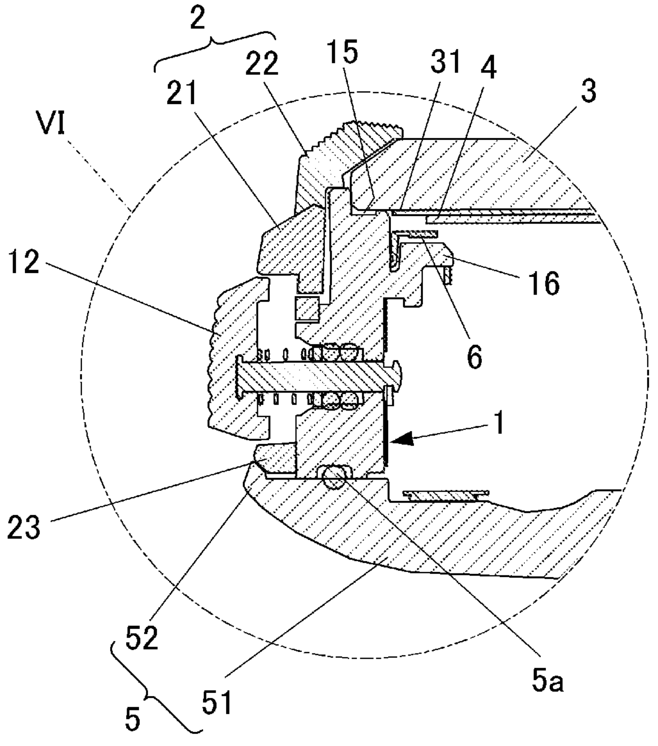
FIG. 6 is a magnified cross-sectional view of the essential part of a VI portion indicated by a circle of a broken line in FIG. 5.

FIG. 1 is a front view of the watch in the present embodiment. FIG. 2 is a perspective view showing a cross section of part of the watch shown in FIG. 1. FIG. 3 is a cross-sectional view of the watch taken along the line A-A in FIG. 1. FIG. 4 is a cross-sectional view of the watch taken along the line B-B in FIG. 1. FIG. 5 is a cross-sectional view of the watch taken along the line C-C in FIG. 1. FIG. 6 is a magnified view of a VI portion enclosed by a dashed-dotted line in FIG. 5. Illustration of a module 10 (a circuit board 8 and the like constituting the module 10) housed in a device casing 1 is omitted in the diagrams except FIG. 3.

As shown in FIG. 1 to FIG. 6, a watch 100 in the present embodiment has the device casing 1.

The device casing 1 of the present embodiment is a cylindrical member formed in a hollow, short-columnar shape opened at the top and bottom. A hollow portion in the device casing 1 constitutes a housing space in which various components such as the module 10 of the watch 100 are housed.

The device casing 1 is formed of a relatively hard synthetic resin such as biomass plastic, engineering plastic, or super engineering plastic, for example. The material that forms the device casing 1 is not limited to those illustrated herein.

In some conventional electronic devices, a device casing and an exterior have different colors from each other because the device casing and the exterior are separate members and are made of different materials.

This raises a problem in that the device casing, if exposed to the appearance, impairs the design characteristic.

An electronic device and a watch for remedying such a situation and improving the design characteristic of the appearance will be described below.

In a case where the device casing 1 is a casing made of resin, any of various additives may be added to the resin material that forms the device casing 1. An antenna 6 (an antenna element portion of the antenna 6), for example, is included in the module 10 (see FIG. 3) to be housed in the device casing 1 in the present embodiment as will be described later.

In the case where the antenna 6 is included in the device casing 1, an additive for improving antenna sensitivity, such as for adjusting the dielectric constant of the resin material, for example, is conceivable as an additive to be added to the resin material that forms the device casing 1. The type of additive to be added, an amount to be added, and the like are set as appropriate depending on content of required adjustment.

In order to improve strength such as resistance to water pressure and resistance to impact of the device casing 1, any of various reinforcing agents such as glass fiber or carbon fiber, for example, may be added to the resin material that forms the device casing 1.

A pair of band attachment portions 11 (see FIG. 1) to which bands 111 are attached are provided on the outer surface of the device casing 1 at upper and lower positions (the positions of 12 o'clock and 6 o'clock on an analog watch) in FIG. 1.

Various operation buttons 12 (such as a push button and a crown) for a user to perform various input operations are provided on left and right lateral sides and the like of the device casing 1 in FIG. 1. That is to say, the operation buttons 12 are provided on the outside of a resin member (such as a bezel 2 and a decorative component 23) provided on the outside of the device casing 1. Thus, operability of the operation buttons 12 is not impaired even in the case where the device casing 1 is almost covered with the resin member. In the example shown in FIG. 1 and the like, push buttons are provided as the operation buttons 12 on the lateral side of the device casing 1 respectively at the positions of substantially 2 o'clock, 4 o'clock, 8 o'clock, 9 o'clock, and 10 o'clock on the analog watch.

An opening on the front surface side of the device casing 1 (a visible side of the watch) is closed with a windshield 3. The windshield 3 is a transparent member (cover glass) formed of a glass material, a resin material transparent to visible light, or the like, for example. As shown in FIG. 1 to FIG. 5, the windshield 3 is formed in a disc shape having such a diameter that the opening of the device casing 1 is closed. A stepped portion 15 (see FIG. 6 and the like) is formed along the inner circumference in the opening on the front surface side of the device casing 1 in the present embodiment, and the windshield 3 is arranged on the stepped portion 15.

As will be described later, the bezel 2 as an exterior is arranged on the front surface side of the device casing 1. As shown in FIG. 1 to FIG. 6, the bezel 2 is provided to cover at least part of an outer circumferential edge of the windshield 3, and the windshield 3 is bonded to the device casing 1 or the bezel 2. The windshield 3 is sandwiched between the surface of the stepped portion 15 of the device casing 1 and the bezel 2, thus being reliably fixed. It is not essential for the windshield 3 to be bonded to the device casing 1 or the bezel 2, and the windshield 3 may be fixed by being sandwiched between the device casing 1 and the bezel 2.

As described above, the windshield 3 is fixed by being bonded or sandwiched between the bezel 2 and the device casing 1 in the present embodiment, thus not depending upon the strength and rigidity of the device casing 1 as compared with a case such as when press-fitting and fixing the windshield 3 to the device casing 1.

A solar panel 4 is applied to the back surface side of the windshield 3 (that is, the side arranged on the inner side of the device casing 1).

The solar panel 4 is a solar cell that generates power by receiving light. Generated power obtained by solar power generation by the solar panel 4 is stored in a secondary battery housed in the device casing 1 to serve as a power source for each part of the watch 100.

As shown in FIG. 1, the solar panel 4 of the present embodiment is a panel formed in a hollow ring (annular) shape in plan view when the watch 100 is seen from its front surface. The inner diameter and outer diameter of the solar panel 4 are set as appropriate depending on a power generation amount required for the solar panel 4 to generate, or the like. An inner side of the solar panel 4 having a ring (annular) shape serves as a display area Arv (indicated by a dashed-dotted line in FIG. 1) provided by a display 7 which will be described later. Therefore, the inner diameter of the solar panel 4 is set so as not to overlap the display area Arv in accordance with a range to be ensured as the display area Arv.

The solar panel 4 is, for example, a black member or the like, and it is not preferable that the solar panel 4 be seen through the windshield 3 from the perspective of appearance design. Further, the solar panel 4 is provided at a width corresponding to the required power generation amount as described earlier, and is not necessarily provided to an outer circumferential end of the windshield 3.

In a portion where nothing but the windshield 3 is provided (that is, a portion other than the inside of the display area Arv in which the display 7 is arranged under the windshield 3 and the portion in which the solar panel 4 is arranged), the inside of the device casing 1 might be seen through the transparent windshield 3. If the inside of the device casing 1 is seen, it is not preferable from the design perspective.

Therefore, in the present embodiment, at least part of the windshield 3 is provided with a decoration for blindfolding. Specifically, a decorative portion 31 is provided on the outer circumferential side of the windshield 3 to provide blindfolding such that the inside s not seen from the outside.

The decorative portion 31 for blindfolding is formed by serigraphy, for example. A technique for providing the decorative portion 31 is not particularly limited. The decorative portion 31 may be provided by any technique such as vapor deposition or plating, for example, or may be provided by applying a seal or the like.

It is sufficient that the decorative portion 31 for blindfolding is provided for at least part of the windshield 3, and its specific position and range are not limited. In the present embodiment, the decorative portion 31 for blindfolding is provided on the back surface side of the windshield 3 (the side arranged on the inner side of the device casing 1) and on the outer side relative to the portion in which the solar panel 4 is provided (that is, on the outer circumferential side relative to an inner circumferential side 41 (see FIG. 1) of the solar panel 4 which is the boundary between the solar panel 4 and the display area Arv). The illustration of FIG. 1 and the like shows an example in which edge cutting such as chamfering is performed to an upper surface of the windshield 3 at the outer circumferential edge to be beveled, and the decorative portion 31 indicated by hatching is provided on the outer circumferential side relative to the inner circumferential side 41 of the solar panel 4 up to the side in front of the bevel. However, the decorative portion 31 may be provided widely in a range also including the beveled portion at the outer circumferential edge of the windshield 3.

Therefore, the display area Arv of the display 7, the solar panel 4, and the decorative portion 31 for blindfolding are arranged sequentially from a central portion in the planar direction when the watch 100 is seen from the front surface side (visible side) of the watch 100, which prevents the inside of the device casing 1 from being seen through the windshield 3 which is a transparent member such as glass and provides a beautiful appearance.

As described earlier, the bezel 2 as an exterior for decoration is arranged on the front surface side of the device casing 1. The bezel 2 is attached with a screw 9 (see FIG. 1) or the like, for example. The technique (fixing technique) for attaching the bezel 2 is not particularly limited, and any attaching means (fixing means) other than the screw 9 is usable. The bezel 2 is arranged so as to surround the outer circumferential edge of the windshield 3 and press the windshield 3 from above. The bezel 2 is a member formed of a resin material having flexibility (elasticity), such as urethane, for example, and formed in a substantially annular shape when the watch 100 is seen in the direction from the visible side.

Forming the bezel 2 of a resin material such as urethane achieves weight reduction of the bezel 2, facilitates processing as compared with a case of metal processing, and improves the degree of freedom of shape. Further, providing the bezel 2 of the resin material (particularly, a material having flexibility (elasticity), such as urethane) as an exterior of the watch 100 enables an external impact to be received by the bezel 2, thus preventing the device casing 1 from directly receiving an impact. This also improves the resistance to impact of the watch 100 as compared with a case of forming the bezel 2 of a metal material.

The bezel 2 serving as an exterior in the present embodiment is arranged on the front surface side of the device casing 1 and has a hanging portion provided hanging from the front surface side so as to cover at least part of the lateral surface.

Specifically, the bezel 2 of the present embodiment includes a first bezel 21 and a second bezel 22 held by the first bezel 21. As shown in FIG. 1 and the like, for example, the first bezel 21 protrudes relative to other portions at four places of the positions of 3 o'clock, 6 o'clock, 9 o'clock, and 12 o'clock, for example, on the analog watch along the circumference of the bezel 2. The first bezel 21 holds the second bezel 22 at these protruding portions, so that the first bezel 21 and the second bezel 22 are integrated.

The surface (upper surface) of the bezel 2 includes the protruding portions of the first bezel 21 at the four places and an exposed portion of the second bezel 22 without being covered with the first bezel 21 (the protruding portions of the first bezel 21).

In each of the cross sections A-A, B-B, and C-C in FIG. 1, part of the bezel 2 is provided hanging from the front surface (upper surface) side of the device casing 1 so as to cover at least part of the lateral surface of the device casing 1 from the front surface side. In the example shown in FIG. 2 and FIG. 3 to FIG. 6, for example, part of the first bezel 21 extends to the lateral surface side of the device casing 1. The portion that extends to the lateral surface side of the device casing 1 is the hanging portion of the bezel 2.

It is not essential for the bezel 2 to be composed of the first bezel 21 and the second bezel 22. The bezel 2 may be an integral member formed to extend from the front surface side to the lateral surface side of the device casing 1. In the present embodiment, the operation buttons 12 are attached to a plurality of places on the lateral surface of the device casing 1 as described earlier, and the bezel 2 is arranged in a manner avoiding the operation buttons 12. However, it is not essential to provide the operation buttons 12. In the case of not providing the operation buttons 12, such a bezel 2 that continuously covers the front surface side to the lateral surface side of the device casing 1 may be provided.

An opening portion on the back surface side of the device casing 1 (an invisible side of the watch) is closed with the back cover 5. As shown in FIG. 2, FIG. 3, and the like, the back cover 5 is attached to the device casing 1 with a waterproof ring 5*a* or the like, for example, interposed therebetween. By attaching the back cover 5 to the device casing 1 with the waterproof ring 5*a* or the like interposed therebetween, the opening portion on the back surface side of the device casing 1 (the invisible side of the watch) is closed while ensuring waterproofness (airtightness) in the device casing 1.

The back cover 5 is formed of a relatively hard synthetic resin such as biomass plastic, engineering plastic, or super engineering plastic, for example.

Any of various reinforcing agents such as glass fiber or carbon fiber, for example, is added to the resin material that forms the back cover 5 in the present embodiment. By adding a reinforcing agent such as carbon fiber to the resin material that forms the back cover 5, the back cover 5 is improved in strength, thus preventing deflection or deformation from occurring even under external pressure such as great water pressure. Even under pressure, the back cover 5 is less likely to be broken or cracked, thus increasing resistance to water pressure, resistance to impact, and the like of the watch 100.

The back cover 5 is a substantially dish-like member, and has a back cover body 51 that covers the back surface side of the device casing 1 and a rising portion 52 that rises from the surface (that is, the back cover body 51) on the back surface side so as to cover at least part of the lateral surface of the device casing 1. The rising portion 52 rises from an outer circumferential edge of the back cover body 51, but does not need to rise up to the same height along the entire outer circumference. In the example shown in FIG. 3 and the like, for example, the rising portion 52 hardly rises at the portion in which the operation button 12 is provided (see the left side in FIG. 3). At the portion in which the operation button 12 is not provided (see the right side in FIG. 3), the rising portion 52 rises to about such a height that the rising portion 52 comes into contact with the bezel 2 provided hanging from the front surface side of the device casing 1.

Further, in the present embodiment, a decorative component 23 is arranged between the bezel 2 (the hanging portion of the bezel 2) provided hanging from the front surface side of the device casing 1 and the back cover 5 (the rising portion 52 of the back cover 5). The decorative component 23 is formed in a substantially ring (annular) shape in plan view from the visible side.

The decorative component 23 is formed of a resin material having flexibility (elasticity), such as urethane, similar to the bezel 2, for example, and is colored in a color different from that of the bezel 2 or the back cover 5. The decorative component 23 is fixed by being sandwiched between the hanging portion of the bezel 2 and the rising portion 52 of the back cover 5, and is partially seen between the bezel 2 and the back cover 5 to provide an accent color. This increases the design characteristic of the appearance of the watch 100.

When the members such as the bezel 2 and the decorative component 23 provided on the front surface side and lateral surface of the device casing 1 are formed of a material having flexibility (elasticity), such as urethane, the device casing 1 surrounded with these members is prevented from directly receiving a strong impact. Therefore, the watch 100 has a structure excellent in resistance to impact.

In the present embodiment, all of the bezel 2 and the decorative component 23 formed of urethane or the like and the back cover 5 formed of a highly rigid resin material constitute the resin member provided on the outside of the device casing 1.

The back cover 5 covers part of the lateral surface from the back surface side of the device casing 1 and is integrated with the bezel 2 provided from the front surface side (visible side) of the device casing 1 with the annular decorative component 23 interposed therebetween, thus achieving such a structure that the circumference of the device casing 1 except the portion where the windshield 3 is provided is almost covered. Therefore, the resin member prevents at least the circumferential surface (lateral surface) and the bottom surface side of the device casing 1 from being exposed outside.

The resin member surrounding the device casing 1 includes a plurality of parts of the bezel 2, the decorative component 23, and the back cover 5.

The decorative component 23 may be a single component formed integrally with the bezel 2. The members from the back cover 5 to the bezel 2 may be a single component formed integrally. In this case, the resin member surrounding the device casing 1 constitutes a continuous integral structure, thus achieving higher resistance to water, resistance to water pressure, resistance to impact, and the like.

As described earlier, the module 10 (see FIG. 3) including a watch movement and the like including various motors and the like not shown is housed in the hollow device casing 1. In the present embodiment, the module 10 includes the antenna 6, the display 7, the circuit board 8, and the like, for example.

The display 7 is a liquid crystal panel unit including a liquid crystal display (LCD) or the like, for example. In the present embodiment, the display 7 displays the time, date, and other various types of information in the display area Arv. The display 7 is not limited to the liquid crystal panel unit, and may be implemented by a display such as an organic electroluminescence display or another flat display, for example. The display 7 is not limited to one that presents a display in a digital mode, but may be one that presents a display in an analog mode having a pointer or in a digital-analog hybrid mode.

The circuit board 8 has various electronic components 81 (see FIG. 3) and the like mounted on its front side or back side surface.

The antenna 6 in the present embodiment is a GPS antenna capable of receiving a GNSS (GPS/GLONASS/QZSS/SBAS) signal transmitted from a satellite of GPS or the like (including a plurality of types such as GLONASS in addition to GPS, but hereinafter simply referred to as "GPS"), for example.

In the present embodiment, an inward flange 16 (see FIG. 6 and the like) projecting from the inner circumferential surface of the device casing 1 toward the inside of the casing is formed in the vicinity of the opening on the front surface side of the device casing 1, and the antenna 6 (the antenna element portion of the antenna 6) is arranged on the flange 16.

A desired frequency band in the GPS antenna is the L1 band (around 1.6 GHz), the L5 band (around 1.2 GHz), or the like, and it is desired that the antenna 6 should have high antenna performance (particularly, an antenna gain corresponding to a right-handed polarized wave) in these frequency bands. However, the antenna 6 (the antenna element portion of the antenna 6) of the present embodiment is formed to have a small size and length so as to be housed in the device casing 1, and an electric distance (electric length) is short. Therefore, a frequency at which the antenna 6 easily receives radio waves and a frequency at which the antenna 6 easily radiates radio waves are higher than a desired frequency band. The desired frequency band is a frequency band such as the L1 band (around 1.6 GHz) or the L5 band (around 1.2 GHz) in which a GNSS (GPS) signal is transmitted as described earlier.

In this respect, the device casing 1 in which the antenna 6 (the antenna element portion of the antenna 6) is housed is formed of a resin material which is a dielectric substance. In a case where the antenna 6 is surrounded with a dielectric substance, a phenomenon in which the wavelength of radio waves is shortened depending on the relative permittivity of the dielectric substance is confirmed. That is to say, the "radio wavelength shortening" effect in which the length for an original period of the wavelength itself (the length for one wavelength) is shortened is recognized in the dielectric substance.

It is therefore preferable to add a substance for increasing the relative permittivity to the device casing 1 of the present embodiment as an additive, as described earlier. This enables the "radio wavelength shortening" effect to be obtained effectively, thus achieving resonance with a low frequency band (the aforementioned desired frequency band such as the L1 band or L5 band) even when the antenna 6 (the antenna element portion of the antenna 6) is downsized in order to be housed in the device casing 1.

[Action]

In the present embodiment, the outside of the device casing 1 that houses the module 10 including the antenna 6 is surrounded with the resin member such as the bezel 2, the back cover 5, and the decorative component 23 to prevent at least the circumferential surface and the bottom surface side of the device casing 1 from being exposed outside as described earlier.

In the present embodiment, an additive for increasing the relative permittivity is added to the resin material that forms the device casing 1 such that antenna performance (antenna gain) of the antenna 6 in a desired frequency band (such as the L1 band or L5 band in the case of a GPS antenna, for example) increases.

A reinforcing agent such as glass fiber or carbon fiber, for example, is also added in some cases to the device casing 1 in order to increase its rigidity.

When an additive is added to the resin material that forms the device casing 1, the color of the device casing 1 is affected by the color of the additive.

For example, carbon fiber is black, and in the case where carbon fiber is added to the resin material that forms the device casing for improving rigidity, the color of the device casing 1 is also affected by the color of the carbon fiber.

In this respect, in the present embodiment, the resin member such as the bezel 2 and the back cover 5 is provided so as to wrap around the circumferential surface and the bottom surface side of the device casing 1 as described earlier. This prevents the device casing 1 itself from being exposed outside and eliminates the necessity to consider something about the appearance design. This enables the device casing 1 to be formed using a functionally desirable material (a material to which any of various additives, reinforcing agents, or the like has been added).

[Effects]

As described above, the watch 100 which is the electronic device in the present embodiment includes the cylindrical device casing 1 that houses the module 10, and the resin member provided on the outside of the device casing 1, and the resin member prevents at least the circumferential surface and the bottom surface side of the device casing 1 from being exposed outside.

Therefore, by adding an additive for increasing relative permittivity or a reinforcing agent such as carbon fiber for increasing rigidity to the resin material that forms the device casing 1, for example, the device casing 1 is not seen from the outside even if the degree of freedom in terms of the appearance, such as the color of the device casing 1, is restricted. Therefore, the device casing 1 is formed of a functionally preferable material without the need to consider the perspective of appearance design.

The unnecessity to consider the design of the device casing 1 as described above eliminates the need to subject the device casing 1 to any processing such as coating, plating, or vapor deposition, thus preventing antenna properties adjusted with effort from being shifted later by a subsequent step such as coating.

In the present embodiment, the resin member includes a plurality of parts such as the bezel 2, the back cover 5, and the decorative component 23.

This achieves relatively easy manufacturing and assembly, and enables the device casing 1 to be easily wrapped around with the resin member.

In the present embodiment, the resin member includes the back cover 5. The back cover 5 has the back cover body 51 that covers the back surface side of the device casing 1 and the rising portion 52 that rises from the surface of the back surface side so as to cover at least part of the lateral surface.

As described above, the back cover 5 covers not only the back surface (bottom surface) side of the device casing 1 but also at least part of the lateral surface (circumferential surface), thus reducing joints and wrapping around the device casing 1 from the back surface (bottom surface) side with the back cover 5. This prevents a gap from being created to increase waterproofness, and achieves a configuration excellent in resistance to impact and high rigidity.

In the present embodiment, the material that forms the back cover 5 contains resin to which a reinforcing agent such as carbon fiber or glass fiber has been added.

This makes the back cover 5 less likely to undergo deflection or breaking even if high water pressure or the like is applied to the watch 100, so that the watch 100 has high resistance to water pressure, is less likely to be damaged, and is excellent in high rigidity.

In the present embodiment, the resin member includes the bezel 2 which is an exterior for decoration. The bezel 2 is arranged on the front surface side of the device casing 1 (in the present embodiment, around the opening portion on the front surface side) and has the hanging portion provided hanging from the front surface side so as to cover at least part of the lateral surface.

As described above, the bezel 2 covers not only the front surface side of the device casing 1 but also at least part of the lateral surface (circumferential surface), so that the device casing 1 is wrapped around with the bezel 2 in a wide range. Because of being formed of a material having flexibility (elasticity), such as urethane, the bezel 2 of the present embodiment is excellent in resistance to impact and more effectively protects the device casing 1 and the module 10 housed in the device casing 1 and including the display 7, the various electronic components 81, and the like.

In the present embodiment, the front surface side of the device casing 1 is closed with the windshield 3, and the decorative portion 31 for blindfolding is provided for at least part of the windshield 3.

This prevents the device casing 1 and various structural bodies in the device casing 1 from being seen through the windshield 3 which is a transparent member, thus achieving excellent appearance design.

In the present embodiment, the module 10 housed in the device casing 1 includes the antenna 6.

In order to achieve the antenna 6 having high antenna performance (antenna gain) in a desired frequency band (such as the L1 band or L5 band in the case of a GPS antenna, for example), it is preferable to increase the relative permittivity of the device casing 1 arranged around the antenna 6. However, an additive for increasing the relative permittivity is white or the like in many cases, and when the additive is added to the resin material that forms the device casing 1, the color of the device casing 1 is affected by the color of the additive.

Even in such a case, the device casing 1 is enclosed with the resin member so as not to appear on the appearance, thus providing the antenna 6 that achieves excellent antenna performance in the desired frequency band without impairing the appearance design of the electronic device such as the watch 100. This enables time information or the like included in a GPS signal, for example, to be acquired favorably to perform accurate time correction or the like.

In the present application, the resin member (the bezel 2 and the back cover 5) provided on the outside of the device casing 1 prevents at least the circumferential surface and the bottom surface side of the device casing 1 from being exposed outside. This enables both the strength of the device casing 1 and the design characteristic of the appearance to be improved.

That is to say, in the case of adding any of various reinforcing agents such as glass fiber or carbon fiber to resin that forms the device casing 1 to improve strength such as resistance to water pressure and resistance to impact in order to protect the module 10 and the like housed in the device casing 1, the carbon fiber is black. In some cases where an additive for increasing the relative permittivity is added to the resin that forms the device casing 1 in order to improve sensitivity of the antenna 6 mounted in the device casing 1, a problem arises in that the device casing 1, if exposed to the appearance, impairs the design characteristic because the additive for increasing the relative permittivity is white in some cases. In this respect, these problems are solved by covering the device casing 1 with the resin member. In other words, by covering the outer circumferential lateral surface and the bottom surface of the device casing 1 with another member, the strength of the device casing 1 and the influence on internal electronic components such as the antenna 6 as well as the appearance design characteristic of the watch 100 are both improved.

By surrounding the device casing 1 with the resin member in the case where the watch 100 has the configuration of the electronic device of the present embodiment, excellent appearance design is achieved for the watch 100 while providing a configuration that enables functionality of members housed in the device casing 1, such as the antenna 6, to be increased without the need to care about the appearance design of the device casing 1 itself.

[Modifications]

Although an embodiment of the present disclosure has been described above, it goes without saying that the present disclosure is not limited to such an embodiment and may be variously modified within a range not departing from the scope of the disclosure.

For example, in the present embodiment, the outside of the device casing 1 is surrounded with the resin member composed of a plurality of parts such as the bezel 2, the back cover 5, and the decorative component 23 to prevent the device casing 1 from being exposed outside, but the resin member is not limited to the one composed of a plurality of parts.

For example, the rising portion 52 of the back cover 5 may be provided to surround the entire circumferential surface of the device casing 1 up to the front surface side of the device casing 1. In this case, only the back cover 5 constitutes the resin member surrounding the outside of the device casing 1.

In this case, it is not necessary to provide the bezel 2 and the like as the resin member, which reduces the number of components to achieve a simplified configuration.

Further, the device casing 1 is not limited to the cylindrical shape, and may be, for example, a variant of a shape corresponding to the module or the like housed therein to present a shape different from the appearance of the watch 100. Even in this case, an excellent appearance as a watch is achieved by wrapping around the device casing 1 with a material made of resin to prevent the device casing 1 from being exposed outside.

Although the present embodiment has illustrated the case in which the electronic device is the watch 100, for example, and the case in which the structure surrounding the device casing 1 with the resin member such as the bezel 2 and the back cover 5 is mounted in the watch 100, the electronic device to which the structure surrounding the device casing 1 with the resin member is applicable is not limited to this.

For example, the above-described structure is widely applicable to electronic devices that display various types of data, such as wearable devices such as various smart watches and sport watches, heart rate meters and blood-pressure meters that display biological information such as heart rate and blood flow in addition to time, and devices that display environmental information such as temperature and atmospheric pressure.

Although some embodiments of the present invention have been described and illustrated in detail, the disclosed embodiments are made for purposes of not limitation but illustration and example only. The scope of the present invention should be interpreted by terms of the appended claims.

Although some embodiments of the present invention have been described above, the scope of the present invention is not limited to the above-described embodiments, and includes the scope of the invention recited in the claims and the scope equivalent thereto.

The invention claimed is:

1. An electronic device comprising:
- a cylindrical device casing that houses a module; and
- a resin member provided on an outside of the device casing, wherein:
- the device casing is formed by a resin material to which an additive for increasing a relative permittivity has been added; and
- the resin member prevents a circumferential surface or a bottom surface side of the device casing from being exposed outside, and is formed by a material different from the device casing.

2. The electronic device according to claim 1, wherein:
- the resin member includes a back cover, a first exterior and a second exterior;
- the back cover covers a back surface side of the device casing and includes a rising portion that rises from a surface of the back surface side so as to cover at least part of a lateral surface; and
- the second exterior is located between the first exterior and the back cover, and at least part of a lateral surface of the second exterior is covered by the rising portion.

3. The electronic device according to claim 2, wherein a material that forms the back cover contains resin to which a reinforcing agent has been added.

4. The electronic device according to claim 1, wherein the resin member includes an exterior for decoration.

5. The electronic device according to claim 4, wherein the exterior is arranged on a front surface side of the device casing, and includes a hanging portion provided hanging from the front surface side so as to cover at least part of a lateral surface.

6. The electronic device according to claim 1, wherein a front surface side of the device casing is closed with a windshield.

7. The electronic device according to claim 6, wherein at least part of the windshield is provided with a decoration for blindfolding.

8. The electronic device according to claim 1, wherein the module includes an antenna.

9. The electronic device according to claim 1, wherein an operation button for receiving an input operation is provided on an outside of the resin member.

10. A watch comprising the electronic device according to claim 1.

11. The electronic device according to claim 2, wherein:
- the one side of the second exterior is located near a contact portion between the back cover and a bottom surface of the device casing; and
- the rising portion covers a lateral surface of the one end side of the second exterior.

12. The electronic device according to claim 1, wherein:
- the resin member includes a plurality of parts including a bezel and a back cover; and
- the bezel is formed of a material that is more flexible than the back cover.

13. The electronic device according to claim 1, wherein the device casing is colored by a color of the additive for increasing the relative permittivity.

* * * * *